US010551833B2

(12) United States Patent
Kim et al.

(10) Patent No.: US 10,551,833 B2
(45) Date of Patent: Feb. 4, 2020

(54) METHOD FOR IMAGE CAPTURING USING UNMANNED IMAGE CAPTURING DEVICE AND ELECTRONIC DEVICE SUPPORTING THE SAME

(71) Applicant: Samsung Electronics Co., Ltd., Gyeonggi-do (KR)

(72) Inventors: Tae Kyun Kim, Gyeonggi-do (KR); Min Young Kim, Gyeonggi-do (KR); Young Bae Lee, Gyeonggi-do (KR); Wu Seong Lee, Chungcheongnam-do (KR); Jung Jae Lee, Gyeongsangbuk-do (KR); Seung Nyun Kim, Incheon (KR); Byoung Uk Yoon, Gyeonggi-do (KR); So Young Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 173 days.

(21) Appl. No.: 15/398,287

(22) Filed: Jan. 4, 2017

(65) Prior Publication Data
US 2017/0192422 A1    Jul. 6, 2017

(30) Foreign Application Priority Data
Jan. 4, 2016    (KR) .................. 10-2016-0000581

(51) Int. Cl.
*G05D 1/00*    (2006.01)
*G03B 15/00*    (2006.01)
(Continued)

(52) U.S. Cl.
CPC ......... *G05D 1/0038* (2013.01); *B64C 39/024* (2013.01); *B64D 47/08* (2013.01);
(Continued)

(58) Field of Classification Search
CPC .... G05D 1/0038; B64D 47/08; B64C 39/024; B64C 2201/127; B64C 2201/027;
(Continued)

(56) References Cited

U.S. PATENT DOCUMENTS

2009/0087543 A1    4/2009 Nicholas
2010/0292868 A1*  11/2010 Rotem ................ G05D 1/0038
                                                    701/2
(Continued)

FOREIGN PATENT DOCUMENTS

WO    WO 2009/087543    7/2009
WO    WO 2015/082311    6/2015

OTHER PUBLICATIONS

European Search Report dated Feb. 24, 2017 issued in counterpart application No. 17150295.8-1902, 7 pages.

*Primary Examiner* — Muhammad Shafi
(74) *Attorney, Agent, or Firm* — The Farrell Law Firm, P.C.

(57) ABSTRACT

An unmanned image capturing device and a method of operation thereof are provided. The unmanned image capturing device includes a movement device that moves the unmanned image capturing device; a camera; a communication circuit; a location detection circuit that detects a location of the unmanned image capturing device; a processor; and a memory that stores instructions. The processor moves the unmanned image capturing device, captures a plurality of images, detects a plurality of three-dimensional locations, at which the plurality of images are respectively captured, sends at least one of the captured images and information about the respective detected location of the at least one of the captured images, receives information about a change in the at least one of the captured images or information about an image selection, and controls the
(Continued)

movement device to move the unmanned image capturing device to a location based on the received information.

16 Claims, 13 Drawing Sheets

(51) Int. Cl.
*B64C 39/02* (2006.01)
*B64D 47/08* (2006.01)
*H04N 5/232* (2006.01)
*H04N 7/18* (2006.01)

(52) U.S. Cl.
CPC ....... *G03B 15/006* (2013.01); *H04N 5/23296* (2013.01); *H04N 7/185* (2013.01); *B64C 2201/027* (2013.01); *B64C 2201/127* (2013.01); *B64C 2201/146* (2013.01)

(58) Field of Classification Search
CPC .......... B64C 2201/146; H04N 5/23296; H04N 7/185; H04N 5/23203; H04N 5/2257; G03B 37/02; G03B 15/006
USPC ............................................................ 701/3
See application file for complete search history.

(56) References Cited

U.S. PATENT DOCUMENTS

2011/0311099 A1   12/2011  Derbanne
2014/0336848 A1*  11/2014  Saund .................... G08G 1/054
                                                                           701/3

* cited by examiner

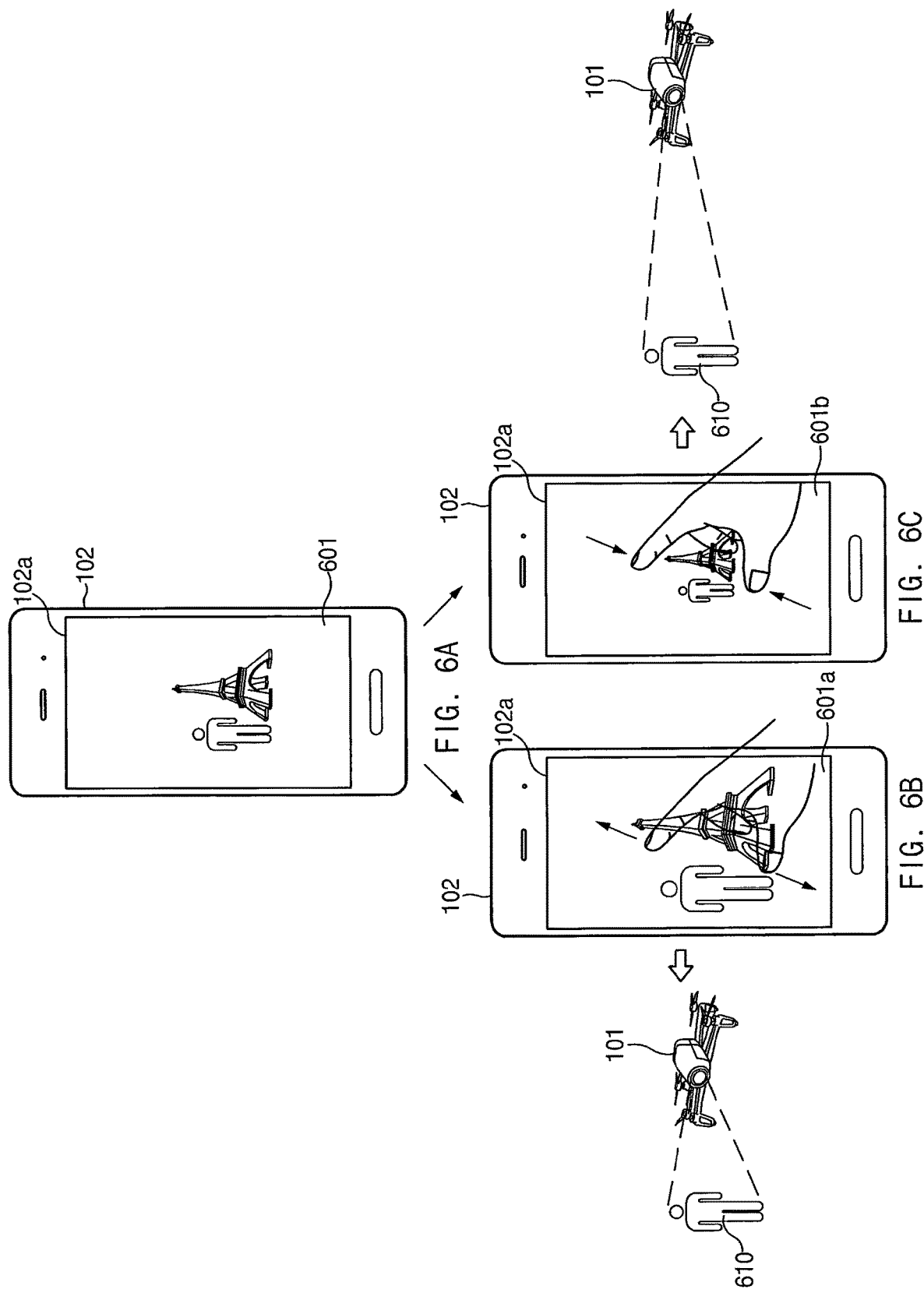

METHOD FOR IMAGE CAPTURING USING UNMANNED IMAGE CAPTURING DEVICE AND ELECTRONIC DEVICE SUPPORTING THE SAME

PRIORITY

This application claims priority under 35 U.S.C. § 119(a) to Korean Patent Application Serial No. 10-2016-0000581, which was filed in the Korean Intellectual Property Office on Jan. 4, 2016, the entire disclosure of which is incorporated herein by reference.

BACKGROUND

1. Field of the Disclosure

The present disclosure relates generally to a method and apparatus for capturing images, and more particularly, to a method of capturing an image by controlling an unmanned image capturing device, an unmanned image capturing device, and a device that operates an unmanned image capturing device.

2. Description of the Related Art

An unmanned image capturing device, e.g. a drone, may capture images such as photographs and/or videos based on a wireless control signal. Commonly, a drone is controlled by a person via a remote controller, e.g., by using radio waves.

A remote controller (or operating device) such as a joystick or a touch button of a smartphone may be used to control a conventional unmanned image capturing device. Generally, a user may move the unmanned image capturing device to a desired location by adjusting an operating stick or an operating button to control motions of the unmanned image capturing device such as pitch-up/pitch-down or roll-left/roll-right. Accordingly, a conventional image capturing method using an unmanned image capturing device requires a user to control a movement direction, an altitude, etc., of the unmanned image capturing device by precisely manipulating an operating device such that the desired image is captured, which is often difficult for the user.

SUMMARY

The present disclosure is made to address at least the above-mentioned problems and/or disadvantages and to provide at least the advantages described below.

Accordingly, an aspect of the present disclosure is to provide an image capturing method that sends an image captured by an unmanned image capturing device to an electronic device such that a user intuitively operates an image output from an electronic device to shoot an image at a location, which the user wants, and an electronic device.

In accordance with an aspect of the present disclosure, an unmanned image capturing device is provided, which includes a movement device that moves the unmanned image capturing device; a camera; a communication circuit; a location detection circuit that detects a location of the unmanned image capturing device; a processor; and a memory that stores instructions, which when executed by the processor, instruct the processor to move the unmanned image capturing device using the movement device; capture a plurality of images using the camera; detect, using the location detection circuit, a plurality of three-dimensional locations, at which the plurality of images are respectively captured; send, using the communication circuit, at least one of the captured images and information about the respective detected location of the at least one of the captured images; receive, through the communication circuit, information about a change in the at least one of the captured images or information about an image selection; and control the movement device to move the unmanned image capturing device to a location based on the received information.

In accordance with another aspect of the present disclosure, a method is provided for operating an unmanned image capturing device. The method includes moving the unmanned image capturing device; capturing at least one image; sending the at least one image to a controller device that operates the unmanned image capturing device; receiving information about a change in the at least one image or information about an image selection from the controller device; and moving the unmanned image capturing device based on the received information.

In accordance with another aspect of the present disclosure, an electronic device is provided for controlling an unmanned image capturing device. The electronic device includes a display; a communication circuit that communicates with the unmanned image capturing device; a processor; and a memory that stores instructions and image data from the unmanned image capturing device, wherein the instructions, when executed by the processor, instruct the processor to receive an image captured by the unmanned image capturing device; output the captured image to the display; receive a user input for converting the output image; and send information based on the converted image to the unmanned image capturing device.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A to 6C illustrate a change of composition through a pinch-in/pinch-out input of a user, according to an embodiment of the present disclosure;

DETAILED DESCRIPTION

Figure 1:
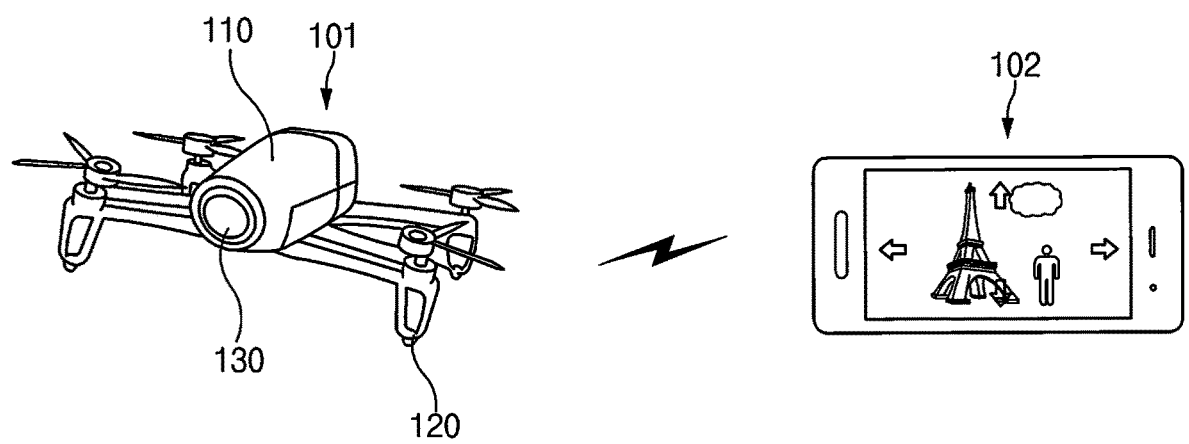
FIG. 1 illustrates an unmanned image capturing device and a controller device, according to an embodiment of the present disclosure.

Hereinafter, various embodiments of the present disclosure will be described with reference to the accompanying drawings. Accordingly, those of ordinary skill in the art will recognize that modifications, equivalents, and/or alternatives of the various embodiments described herein can be made without departing from the scope and spirit of the present disclosure.

With regard to description of drawings, similar components may be identified by similar reference numerals.

Terms in this specification are used to describe certain embodiments of the present disclosure and are not intended to limit the scope of the present disclosure. Unless otherwise defined herein, all the terms, which include technical or scientific terms, may have the same meanings that are generally understood by a person skilled in the art. Terms that are defined in a dictionary and commonly used should also be interpreted as is customary in the relevant related art and not in an idealized or overly formal manner unless expressly defined as such herein. In some cases, even terms that are defined in the specification may not be interpreted to exclude embodiments of the present disclosure.

Terms of a singular form may include plural forms unless otherwise specified.

Herein, the terms "have", "may have", "include", "comprise", "may include", and "may comprise" indicate the existence of corresponding features but do not exclude presence of additional features.

The terms "A or B", "at least one of A or/and B", "one or more of A or/and B", etc., may include any and all combinations of one or more of the associated listed items. For example, the term "A or B", "at least one of A and B", or "at least one of A or B" may refer to (1) at least one A, (2) at least one B, or (3) at least one A and at least one B.

The terms, such as "first", "second", etc., may refer to various elements of various embodiments of the present disclosure, but do not limit the elements. For example, these numerical terms may be used only to distinguish an element from another element and not to limit the order and/or priority of the elements. For example, a first user device and a second user device may represent different user devices, irrespective of sequence or importance. Accordingly, a first element may be referred to as a second element, and similarly, a second element may be referred to as a first element.

When an element (e.g., a first element) is referred to as being "(operatively or communicatively) coupled with/to" or "connected to" another element (e.g., a second element), the first element can be directly coupled with/to or connected to the second element or an intervening element (e.g., a third element) may be present therebetween. However, when the first element is referred to as being "directly coupled with/to" or "directly connected to" the second element, there is no intervening element therebetween.

According to context, the term "configured to" may be used interchangeably with, for example, "suitable for", "having the capacity to", "designed to", "adapted to", "made to", or "capable of". The term "configured to (or set to)" may not mean only "specifically designed to" in hardware. Instead, the expression "a device configured to" may indicate that the device is "capable of" operating together with another device or other components. Accordingly, a "processor configured to (or set to) perform A, B, and C" may indicate a dedicated processor (e.g., an embedded processor) for performing a corresponding operation or a generic-purpose processor (e.g., a central processing unit (CPU) or an application processor (AP)), which may perform corresponding operations by executing one or more software programs stored in a memory device.

An electronic device according to an embodiment of the present disclosure may include a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), an MP3 player, a mobile medical device, a camera, and a wearable device. For example, the wearable devices may include an accessory (e.g., a watch, a ring, a bracelet, an ankle bracelet, glasses, contact lenses, or a head-mounted device (HMD)), a cloth-integrated device (e.g., electronic clothes), a body-attached device (e.g., a skin pad or a tattoo), or an implantable device (e.g., an implantable circuit).

The electronic device may also include furniture or a part of a building/structure, an electronic board, an electronic signature receiving device, a projector, or a measurement device (e.g., a water service, electricity, gas, or electric wave measuring device).

The electronic device may be a flexible electronic device.

The electronic device may also be a combination of any of the aforementioned devices.

Further, the electronic device according to an embodiment of the present disclosure is not limited to the aforementioned devices, but may include new electronic devices, e.g., produced with the development of technologies.

Herein, the term "user" may refer to a person who uses an unmanned image capturing device or a controller device, or may refer to a device (e.g., an artificial intelligence electronic device) that uses the unmanned image capturing device or the controller device.

FIG. 1 illustrates an unmanned image capturing device and a controller device, according to various embodiments.

Referring to FIG. 1, an unmanned image capturing device 101 is controlled through a controller device 102. Although the unmanned image capturing device 101 is illustrated and described as a drone device, the embodiments of the present disclosure are not limited thereto. For example, the unmanned image capturing device 101 may be a robot device that moves to a specified location by using a movement device (e.g., a wheel or a two-leg biped robot) to capture an image.

The unmanned image capturing device 101 includes a housing 110, a movement device 120, and a camera 130.

The interior of housing 110 may include a variety of elements for operation of the unmanned image capturing device 101, in the interior thereof. For example, the housing 110 may include a printed circuit board (PCB) image capturing, on which a processor, a memory, a communication circuit, a sensor, etc., are mounted. The housing 110 may also include a driving circuit, a battery, etc., for operation of the movement device 120. The housing 110 may fix and protect elements therein.

The movement device 120 generates power for a flight of the unmanned image capturing device 101. The movement device 120 includes propellers and motors. The movement device 120 may be supplied with power from a battery in the interior of the housing 110 and may receive a control signal from a processor in the interior of the housing 110. The movement device 120 may move the unmanned image capturing device 101 to a specified location based on the control signal.

The camera 130 captures an image, such as a photograph or a video. At least a part of the camera 130 may be arranged and mounted in the interior of the housing 110. At least a part of a lens unit of the camera 130 may be exposed to the outside of the housing 110 to shoot an ambient environment.

The controller device 102 may send the control signal for controlling the unmanned image capturing device 101. The controller device 102 may send the control signal to the unmanned image capturing device 101 through wireless communication (e.g., Bluetooth, wireless fidelity (Wi-Fi), etc.).

The controller device 102 may be an electronic device (e.g., a smartphone, a tablet PC, etc.) including a display. A user may generate the control signal for controlling the unmanned image capturing device 101 by touching a display screen, without an operating device such as a joystick.

If an image displayed in the display screen is moved, reduced, or enlarged, the controller device 102 may send a corresponding control signal to the unmanned image capturing device 101. For example, when the output image moves up, down, left, and right based on a user input, the controller device 102 may send movement information of the image to the unmanned image capturing device 101. The unmanned image capturing device 101 may move to a location, which is suitable for shooting a corresponding image, based on the movement information. As another example, when the output image is enlarged or reduced according to the user input, the controller device 102 may send expansion/reduction information of the image to the unmanned image capturing device 101. The unmanned image capturing device 101 may move to a location that is suitable for shooting the image changed based on the expansion/reduction information.

The controller device 102 may send movement information of the image on a screen or information about an expansion/reduction ratio to the unmanned image capturing device 101. The unmanned image capturing device 101 may calculate a movement direction or a movement distance based on the information and may move based on the calculated result.

The controller device 102 may calculate movement information such as the movement direction, the movement distance, etc., of the unmanned image capturing device 101, based on the movement information of the image on the screen or the information about the expansion/reduction ratio. The controller device 102 may send the movement information to the unmanned image capturing device 101. The unmanned image capturing device 101 may move by using the received movement information.

In The controller device 102 may send an image, which is moved, enlarged, or reduced on the screen, to the unmanned image capturing device 101. The unmanned image capturing device 101 may extract change information of the image through image processing and may determine the movement information, such as a movement direction, a movement distance, etc., based on the extracted information.

Figure 2:
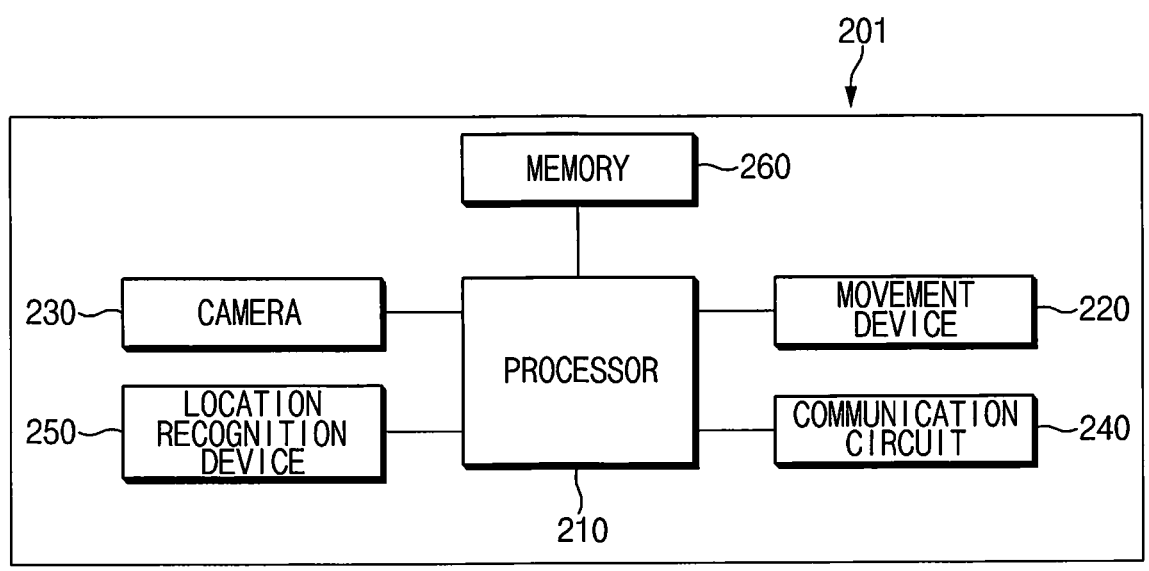
FIG. 2 illustrates an unmanned image capturing device, according to an embodiment of the present disclosure.

FIG. 2 illustrates an unmanned image capturing device, according to an embodiment of the present disclosure.

Referring to FIG. 2, an unmanned image capturing device 201 includes a processor 210, a memory 260, a movement device 220, a communication circuit 240, a location recognition device 250, and a camera 230. Alternatively, the unmanned image capturing device 201 may omit at least one of the above-described elements and/or may include any other element(s).

The processor 210 may include one or more of a CPU, an AP, or a communication processor (CP). The processor 210 may perform, for example, data processing or an operation associated with control or communication of at least other elements of the unmanned image capturing device 201. The processor 210 may move the unmanned image capturing device 101 by using the movement device 220, capture an image by using the camera 230, send and receive data to and from a controller device by using the communication circuit 240, recognize a location of the unmanned image capturing device 201 by using the location recognition device 250, and store the captured image or location information by using the memory 260.

The memory 260 may include a volatile and/or nonvolatile memory. For example, the memory 260 may store an instruction or data associated with at least another element of the unmanned image capturing device 201.

The memory 260 may store an image captured through the camera 230, information about a location at which each image is captured, and camera setting information. When a user modifies an image or selects a specific image, the unmanned image capturing device 201 may move based on location information stored in connection with the image.

The movement device 220 may include at least one propeller, and a motor that provides power to the propeller. The movement device 220 may move the unmanned image capturing device 201 to a location determined according to a control signal by driving the movement device 220 based on the control signal of the processor 210.

The communication circuit 240 may establish communication between, for example, the unmanned image capturing device 201 and a controller device. For example, the communication circuit 240 may transmit the captured image to a controller device through wireless communication. The communication circuit 240 may receive change information of an image from the controller device and provide the processor 210 with the received change information of the image. The change information of the image may be used to determine a movement location of the unmanned image capturing device 201.

The wireless communication may include Wi-Fi, Bluetooth, near field communication (NFC), global navigation satellite system (GNSS), long-term evolution (LTE), LTE advance (LTE-A), code division multiple access (CDMA), wideband CDMA (WCDMA), a universal mobile telecommunications system (UMTS), wireless broadband (WiBro), global system for mobile communications (GSM), etc.

The GNSS may include a global positioning system (GPS), a global navigation satellite system (Glonass), a Beidou Navigation Satellite System (Beidou), or a European global satellite-based navigation system (Galileo), based on a use (or service) area or a bandwidth. Herein, "GPS" and "GNSS" may be interchangeably used.

The location recognition device 250 may recognize location information of the unmanned image capturing device 201 when an image is captured. The location information may include absolute coordinates (e.g., GPS coordinates) or relative coordinates (e.g., a relative distance between a controller device and the unmanned image capturing device 201).

The location recognition device 250 may include a sensor (e.g., an acceleration sensor, a gyroscope sensor, a geomagnetic sensor, etc.) and may detect a movement direction, a movement speed, a tilt, etc., of the unmanned image capturing device 201 by using the sensor.

The camera 230 may capture an image under control of the processor 210. The captured image may be stored in the memory 260 or may be sent to a control device. The camera 230 may capture an image by using a zoom-in/zoom-out function. The camera 230 may shoot a panorama image through a rotation of specified angle (e.g., 360 degrees).

As described above, an unmanned image capturing device includes a housing, a movement device that is attached to the housing and allows the unmanned image capturing device to move, a camera that is attached to the housing or of which at least a part is arranged in the interior of the housing, a communication circuit arranged in the interior of the housing, a location detection circuit that detects a location of the unmanned image capturing device, a processor electrically connected to the movement device, the camera, the communication circuit, and the location detection circuit, and a memory electrically connected to the processor. The memory stores instructions, the instructions, when executed by the processor, causing the processor to fly the unmanned image capturing device in air by using the movement device, to obtain a plurality of images by using the camera while the unmanned image capturing device makes a flight, to detect a plurality of three-dimensional locations, at which the images are captured, by using the location detection circuit, to send at least some of the obtained images and information about the detected locations by using the communication circuit, to receive at least one of the images and/or a signal indicating the locations through the communication circuit, and to control the movement device to move the unmanned image capturing device to a location that is selected based at least a part on the received signal.

The instructions causes the processor to obtain the plurality of images while the processor allows the unmanned image capturing device to move along a preset path.

The plurality of images are captured in units of a specified movement distance or a specified time.

The instructions causes the processor to generate at least one panorama image by using at least some of the plurality of images.

The instructions causes the processor to generate at least one preview image by using at least some of the plurality of images and to send the at least one preview image by using the communication circuit.

The signal comprises change information about an image changed by at least one of moving, enlarging, or reducing of at least some of the plurality of images.

The instructions causes the processor to calculate movement of the unmanned image capturing device by using a spherical coordinate system or a cylindrical coordinate system with respect to an object, which is recognized by using the camera or the communication circuit, based at least a part on the signal.

The instructions causes the processor to maintain the same straight line distance from the object and to move the unmanned image capturing device up, down, left, and right, in response to the signal.

The instructions causes the processor to maintain a same horizontal distance from the object and to move the unmanned image capturing device up, down, left, and right, in response to the signal.

The instructions causes the processor to allow the camera to zoom in or out, or to get closer to or far away from a specified object, based at least a part on the signal.

Figure 3A:
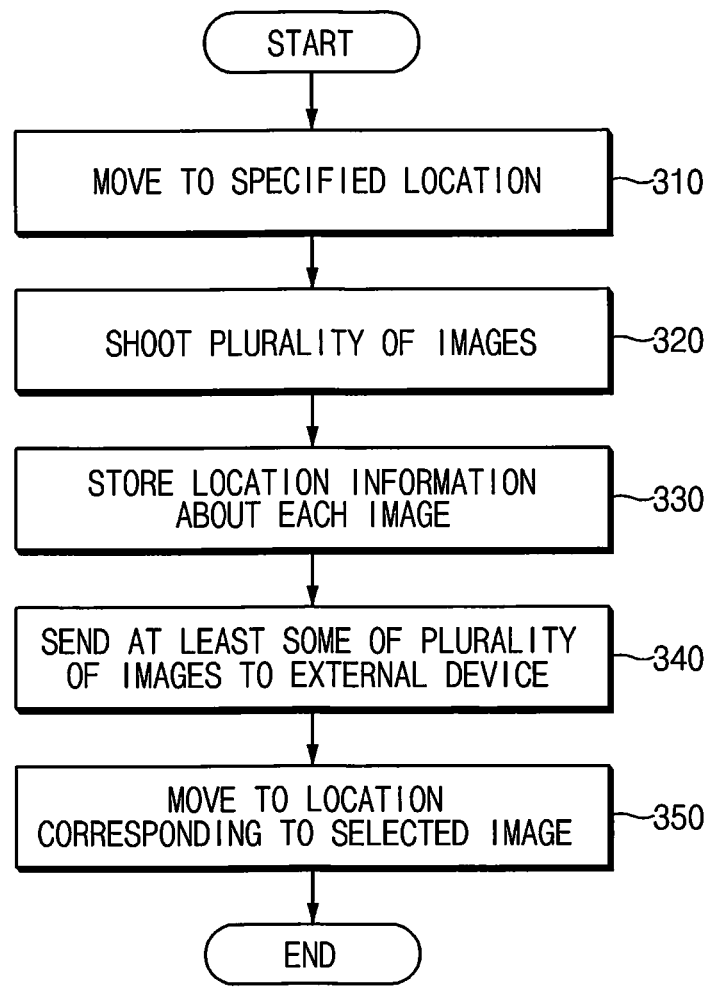
FIG. 3A is a flowchart illustrating an image capturing method, according to an embodiment of the present disclosure.

FIG. 3A is a flowchart illustrating an image capturing method, according to an embodiment of the present disclosure. For example, the method illustrated in FIG. 3A is described as being performed by the unmanned image capturing device 201 illustrated in FIG. 2.

Referring to FIG. 3A, in step 310, the processor 210 moves the unmanned image capturing device 201 by using the movement device 220. The processor 210 may be configured to move the unmanned image capturing device 201 to a location that is set by default or to a location that a user assigns.

A controller device may provide the user with various modes for shooting an image. For example, referring again to FIG. 1, when the user starts to capture an image by using the unmanned image capturing device 101, the electronic controller 102 may provide options of a portrait mode, a landscape mode, a custom mode, etc. In the portrait mode, the unmanned image capturing device 101 may move by a height and a distance (e.g., a height of 2 m from the ground and a distance of 50 cm between the user and the unmanned image capturing device 101), which is suitable for capturing a portrait of person, with respect to the user (or the controller device 102).

In the landscape mode, the unmanned image capturing device 101 may move by a specified height and a specified distance (e.g., a height of 3 m from the ground and a distance of 10 m from a specified object) based on the user (or the controller device 102).

In the custom mode, the unmanned image capturing device 101 may move to a location that the user is previously designated.

Referring again to FIG. 3, in step 320, the processor 210 captures a plurality of images by using the camera 230. The unmanned image capturing device 201 may capture an image by using the camera 230 while moving to an initial setting location. Alternatively, after the unmanned image capturing device 201 moves to a specified location, the unmanned image capturing device 201 may capture a plurality of images while moving along a specified path with reference to a preset object (e.g., a controller device).

For example, the unmanned image capturing device 201 may capture a plurality of images while the unmanned image capturing device 201 moves along a circumference of a circle of a specified size about a controller device. Alternatively, the unmanned image capturing device 201 may shoot a plurality of images while moving along a circumference of a circle of a specified size about an object (e.g., a person, a building, a facility, etc.) that the user selects. As another example, the unmanned image capturing device 201 may shoot a plurality of images while moving along a specified path about an object (e.g., a face of a person), which is recognized through image processing, at intervals (e.g., 0.1 seconds).

In step 330, the processor 210 stores location information about each image by using the location recognition device 250. The location information may include absolute coordinates such as GPS coordinates or relative coordinates (e.g., a relative distance between a controller device and the unmanned image capturing device 201).

For example, the location recognition device 250 may extract the location information by using a change in signal strength of a local area network with a controller device 102, ultrasonic signal strength, etc., or a distance measured based on altitude.

As another example, the location recognition device 250 may extract the location information by recording a movement distance and a movement direction by using a change value of an acceleration sensor, a gyroscope sensor, a geomagnetic sensor, etc., at a reference location (e.g., a location of a controller device).

The processor 210 may store each image and location information in the memory 260.

In step 340, the processor 210 may send at least some of a plurality of images to an external device (e.g., a controller device) through the communication circuit 240. For example, the unmanned image capturing device 201 may send at least some of a plurality of images, which are captured at a specified period (e.g., 0.1 to 1 second), to a controller device. Thereafter, a user may select a desired image from among the received images.

The processor 210 may send, to a controller device, data associated with preview images into which the plurality of images are converted. A preview image may require less data than a captured image, may have a lower resolution lower than a captured image, and/or may be smaller in size than a captured image. Alternatively, the preview image may be a down-sampled image.

In step 350, the communication circuit 240 receives a signal indicating a user input to at least one of the plurality of images from a controller device, and the processor 210 moves the unmanned image capturing device 201 to a location corresponding to the received signal by controlling the movement device 220 based on the received signal.

After the unmanned image capturing device 201 moves to the location corresponding to the received signal, the unmanned image capturing device 201 may automatically capture an image, i.e., a photograph or a video, e.g., after a preset time, or may capture an image in response to a capture signal from the user.

Figure 3B:
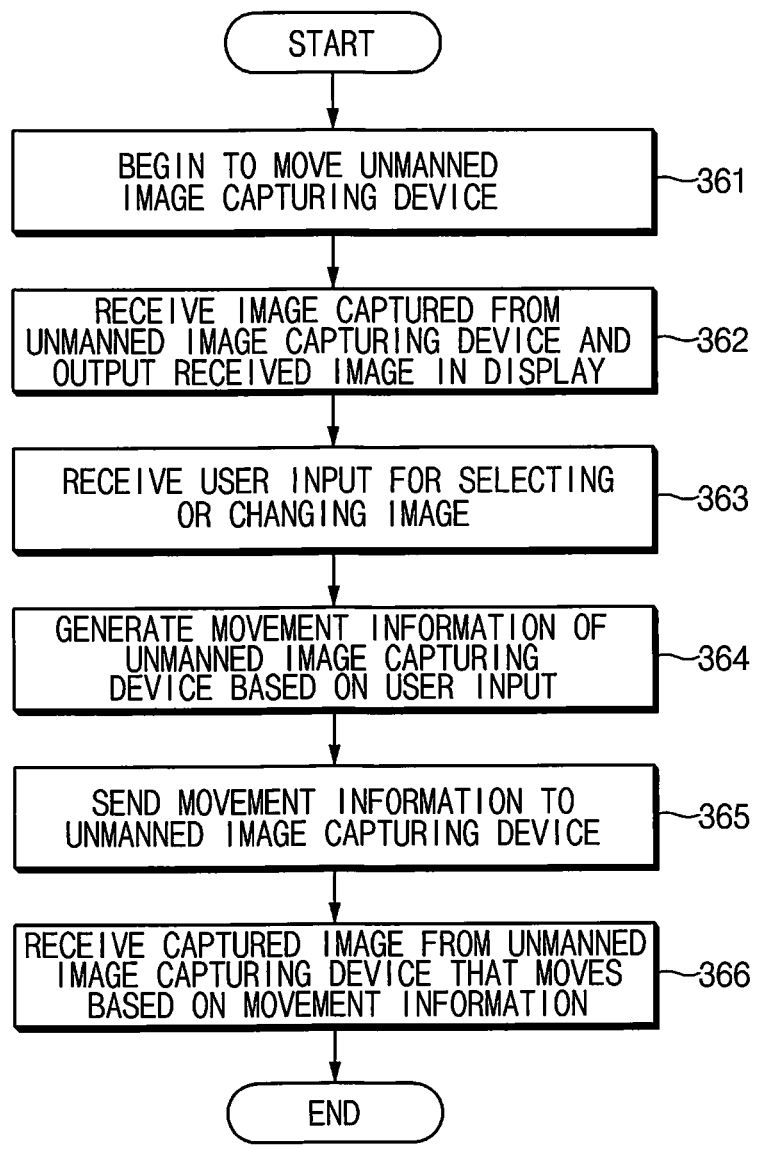
FIG. 3B is a flowchart illustrating an image capturing method in a controller device, according to an embodiment of the present disclosure.

FIG. 3B is a flowchart illustrating an image capturing method in a controller device, according to an embodiment of the present disclosure. For example, the method illustrated in FIG. 3B is described as being performed by the controller device 102 with the unmanned image capturing device 101 illustrated in FIG. 1.

Referring to FIG. 3B, in step 361, the controller device 102 sends a control signal to the unmanned image capturing device 101, which moves in response to the control signal. For example, a user may execute an application, which is installed in the electronic device 102, for controlling the unmanned image capturing device 101. When the user touches a flight start button, a corresponding control signal may be sent to the unmanned image capturing device 101, which starts to fly by driving the movement device 120 based on the control signal.

The unmanned image capturing device 101 may move to a preset location or a location that the user sets. The unmanned image capturing device 101 may be configured to move to the location along a preset path.

In step 362, the controller device 102 receives the captured image from the unmanned image capturing device 101 and outputs the received image in a display. After the unmanned image capturing device 101 is moving or has moved to an initial setting location, the unmanned image capturing device 101 may send the captured image to the controller device 102. The controller device 102 may output the received image to the display.

In step 363, the controller device 102 receives a user input for selecting or changing an image. The user may change a location of the unmanned image capturing device 101 by operating the image output to the display. For example, the user input may select one of a plurality of images or may move, enlarge, and/or reduce the output image.

In step 364, the controller device 102 generates movement information of the unmanned image capturing device 101 based on the user input. The movement information may include a movement direction, a movement coordinate, etc., of the unmanned image capturing device 101.

For example, when the user input is for selecting one of a plurality of images, the movement information may be coordinates stored together with the image. As another example, when the user input is for moving, enlarging, and/or reducing the output image, the movement information may be coordinate information calculated according to a change degree of the image.

In step 365, the controller device 102 sends movement information to the unmanned image capturing device 101. The unmanned image capturing device 101 may move to a corresponding location by operating the movement device 120 based on the received movement information. The unmanned image capturing device 101 may take a photograph or a video automatically or in response to a signal from the controller device 102.

In step 366, the controller device 102 receives a captured image from the unmanned image capturing device 101 that moves based on the movement information. The controller device 102 outputs the captured image through the display. The user may obtain the photo or the video, by operating the image. When the user verifies the captured image, additionally changes composition based on the verified image, and wants to take a photograph based on the changed composition, the user may change a location of the unmanned image capturing device 101 by operating the corresponding image again.

As described above, a method of operating an unmanned image capturing device comprising a movement device and a camera, the method may include moving the unmanned image capturing device by using the movement device, shooting at least one image by using the camera, sending the at least one image to an electronic device that operates in conjunction with the unmanned image capturing device in advance, receiving information about a change in the at least one image or information about image selection from the electronic device and moving the unmanned image capturing device based on s the information.

The shooting of the at least one image may include shooting, by the unmanned image capturing device, the at least one image at a preset location based on the preset location.

The shooting of the at least one image may include collecting a plurality of images captured while the unmanned image capturing device moves along a preset path.

The collecting of the plurality of images may include collecting a plurality of images captured in units of a specified movement distance or a specified time.

The shooting of the at least one image may include storing at least one of shooting location information or shooting setting information of the unmanned image capturing device, in which the at least one image is shot.

The shooting of the at least one image may include shooting a panorama image by rotating the camera at a specified angle or more.

The receiving of the information about the change may include receiving selection information of a partial image that composes the panorama image.

The moving of the unmanned image capturing device may include moving the unmanned image capturing device based on a ratio of the panorama image to the partial image.

The sending of the at least one image may include generating a preview image by converting the at least one image, and sending data associated with the preview image to the electronic device.

The receiving of the information about the change in the at least one image may include receiving at least one of movement information or expansion information of the at least one image.

The moving of the unmanned image capturing device may include maintaining a same straight line distance from a specified object based on the movement information, and moving the unmanned image capturing device up, down, left, and right.

The moving of the unmanned image capturing device may include maintaining a same horizontal distance from a specified object based on the movement information, and moving the unmanned image capturing device up, down, left, and right.

The moving of the unmanned image capturing device may include allowing the camera to zoom in or out or getting close to or away from a specified object, based on the expansion information.

Figure 4A:
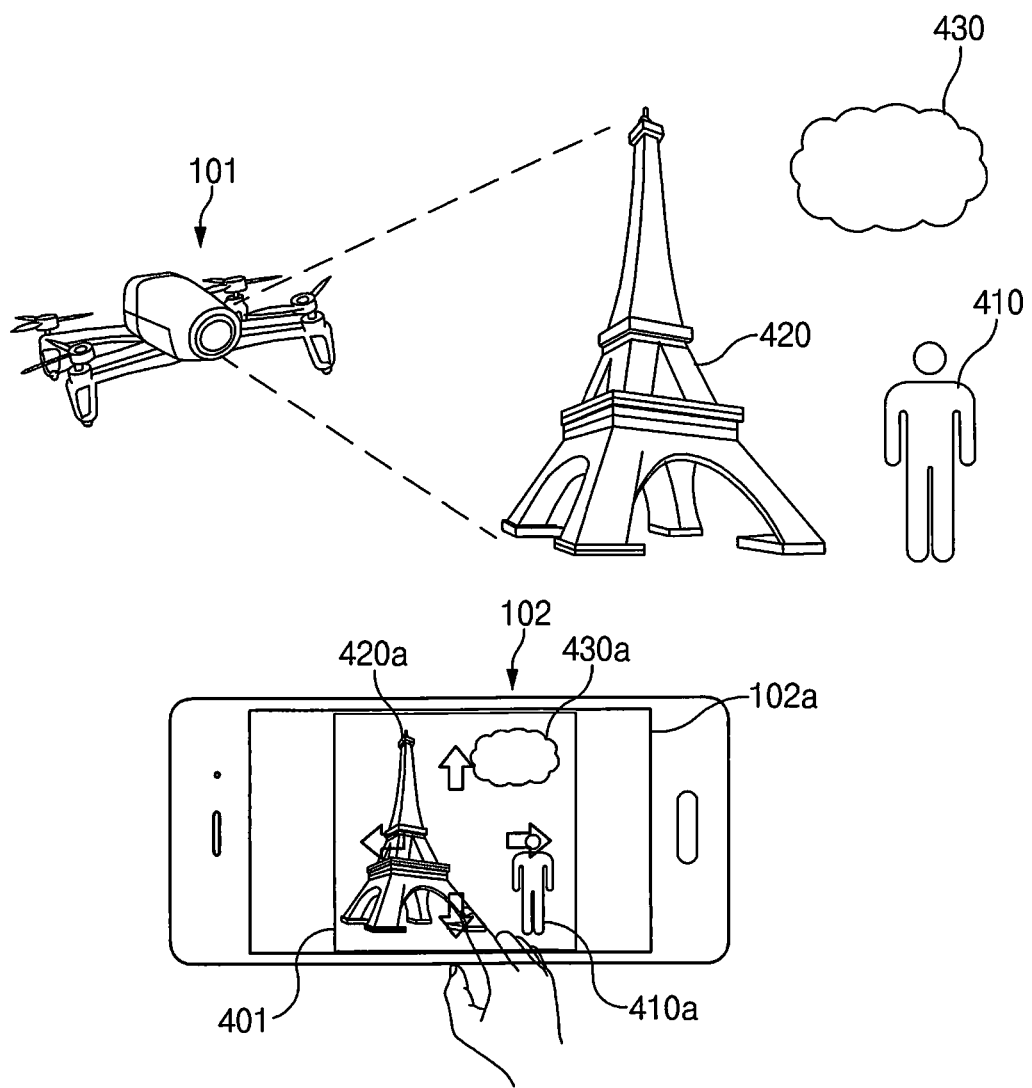
FIG. 4A illustrates an operation of an unmanned image capturing device by using an image, according to an embodiment of the present disclosure.

FIG. 4A illustrates an operation of an unmanned image capturing device by using an image, according to an embodiment of the present disclosure. For example, the operation illustrated in FIG. 4A is described with reference to the unmanned image capturing device 101 and the controller device 102 illustrated in FIG. 1.

Referring to FIG. 4A, the unmanned image capturing device 101 captures an image by using a camera with respect to a specified object (e.g., a user 410 or the controller device 102, which is held by the user 410). Although the following description refers to the unmanned image capturing device 101 moving with respect to the user 410 or the controller device 102, the present disclosure is not limited thereto. For example, the unmanned image capturing device 101 may be configured to be selected by the user 410 or to move with respect to an object (e.g., a nearby building or a person) recognized through image processing. The unmanned image capturing device 101 may send an image, which is being captured through a camera, or an image, which is previously stored, to the controller device 102.

The controller device 102 displays an image 401, which the unmanned image capturing device 101 sends, in a display 102a. A user may control the unmanned image capturing device 101 by using the image 401 output through the display 102a. For example, when first to third objects 410 to 430 are captured through a camera, the image 401 may include captured objects 410a to 430a respectively corresponding to the first to third objects 410 to 430. The image 401 that the unmanned image capturing device 101 sends may be adjusted based on information (e.g., a size, a resolution, etc.) about the display 102a of the controller device 102 and may be displayed.

The user may move the image 401 displayed in the display 102a by using a touch input. For example, when the user swipes left in the display 102a, all the captured objects 410a to 430a may move to a left side of the display 102a. Although FIG. 4A illustrates the captured objects being able to move up, down, left, and right, the present disclosure is not limited thereto. For example, the user may touch one point of the image 401 and may move in various directions such as an upward direction, a downward direction, a leftward direction, a rightward direction, a diagonal direction, etc.

When the image 401 moves according to a touch input of the user and the user ends the touch input, the controller device 102 may send movement information of the image 401 to the unmanned image capturing device 101.

The unmanned image capturing device 101 may move by a distance corresponding to a distance, which the user has moved the image 401, with respect to a specified object (e.g., the user 410). The unmanned image capturing device 101 may move in proportion to a change distance of the image 401. For example, when the user moves the image 401 by +3 cm in the x-direction (e.g., a horizontal direction) and by +4 cm in the y-direction (e.g., a vertical direction), the unmanned image capturing device 101 may move by 30 cm in the horizontal direction and 40 cm in the vertical direction with respect to the user 410. Even though the user does not make a fine operation, such as an altitude adjustment, a direction adjustment, etc., by using an operating stick or a touch button, the user may intuitively move the image 401, which automatically moves the unmanned image capturing device 101 based on the movement result. Accordingly, the user may easily capture a desired image, merely by moving the image 401.

Figure 4B:
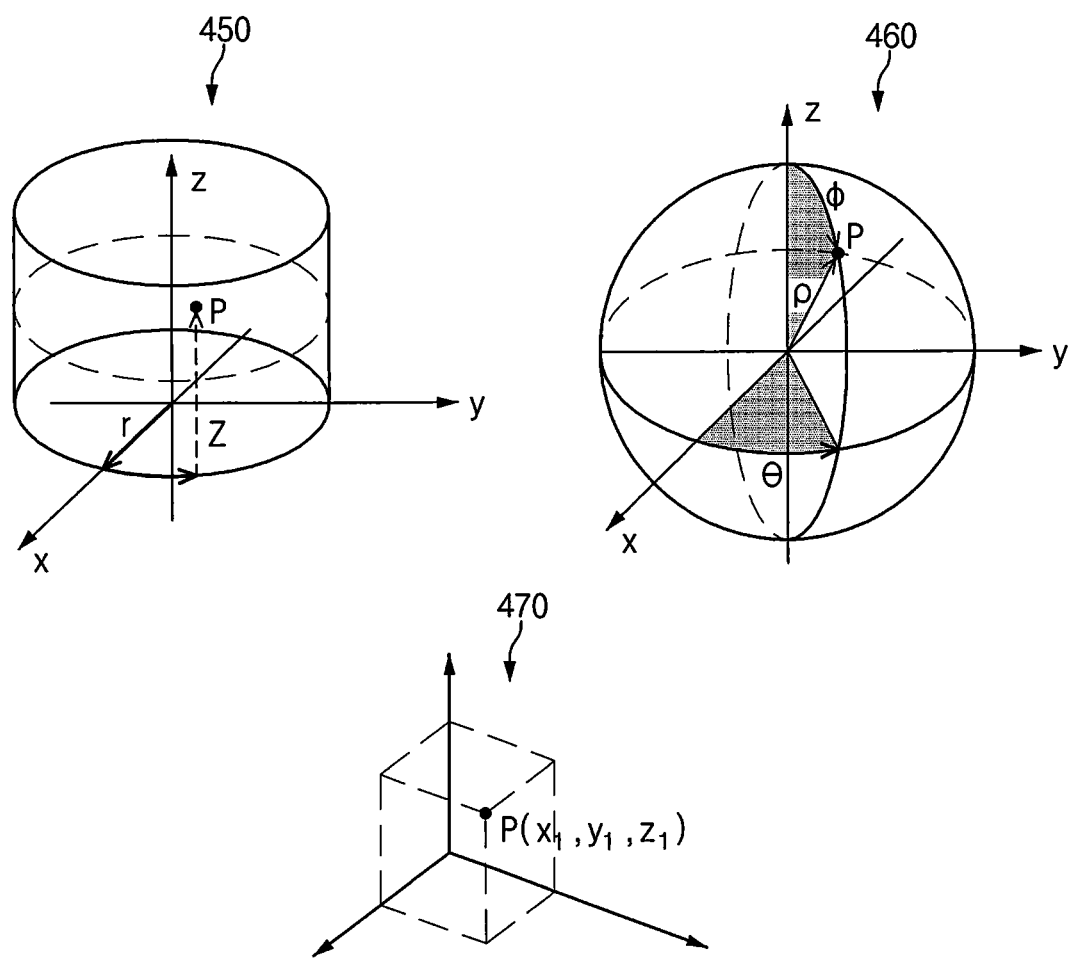
FIG. 4B illustrates a location movement of an unmanned image capturing device through transformation of a coordinate system, according to an embodiment of the present disclosure.

FIG. 4B illustrates a location movement of an unmanned image capturing device through transformation of a coordinate system, according to an embodiment of the present disclosure.

Referring to FIG. 4B, the unmanned image capturing device may move with respect to a specified object, and a location movement of the unmanned image capturing device may be calculated by using a cylindrical coordinate system 450 or a spherical coordinate system 460.

When a user moves a displayed image up, down, left, and/or right (e.g., drag a screen up, down, left, and right), the unmanned image capturing device may move about a specified center of rotation based on a movement direction and a movement degree of the image. The center of rotation may be an object (e.g., an object or a person) that a controller device or a user selects.

The center of rotation may correspond to an origin of the cylindrical coordinate system 450 or the spherical coordinate system 460. The controller device may set an object, which the user selects in an image displayed in a display, as the center of rotation.

A change value (e.g., a movement value of an image) of an image based on an user input may be calculated by applying the change value to a θ value of the cylindrical coordinate system 450 or the spherical coordinate system 460. Coordinates of 'P' that will become target coordinates may be changed into a coordinate value of a rectangular coordinate system 470. The unmanned image capturing device may move to a location corresponding to the coordinate value of the rectangular coordinate system 470. A coordinate transformation algorithm may be performed in the unmanned image capturing device or the controller device.

The unmanned image capturing device may be configured to move in a horizontal distance range, which is the same as that of a specified object (e.g., the controller device), in response to the user input for moving an image. In this case, an arithmetic operation on movement of the unmanned image capturing device may be performed through the cylindrical coordinate system 450. Alternatively, the unmanned image capturing device may be configured to move in a straight line distance range, which is the same as that of a specified object (e.g., the controller device), in response to the user input for moving an image. In this case, an arithmetic operation on movement of the unmanned image capturing device may be performed through the spherical coordinate system 460.

FIGS. 5A to 5D illustrate movement of an unmanned image capturing device by using an image, according to an embodiment of the present disclosure. For example, the operations illustrated in FIGS. 5A to 5D is described with reference to the unmanned image capturing device 101 and the controller device 102 illustrated in FIG. 1.

Figures 5A, 5B, 5C:
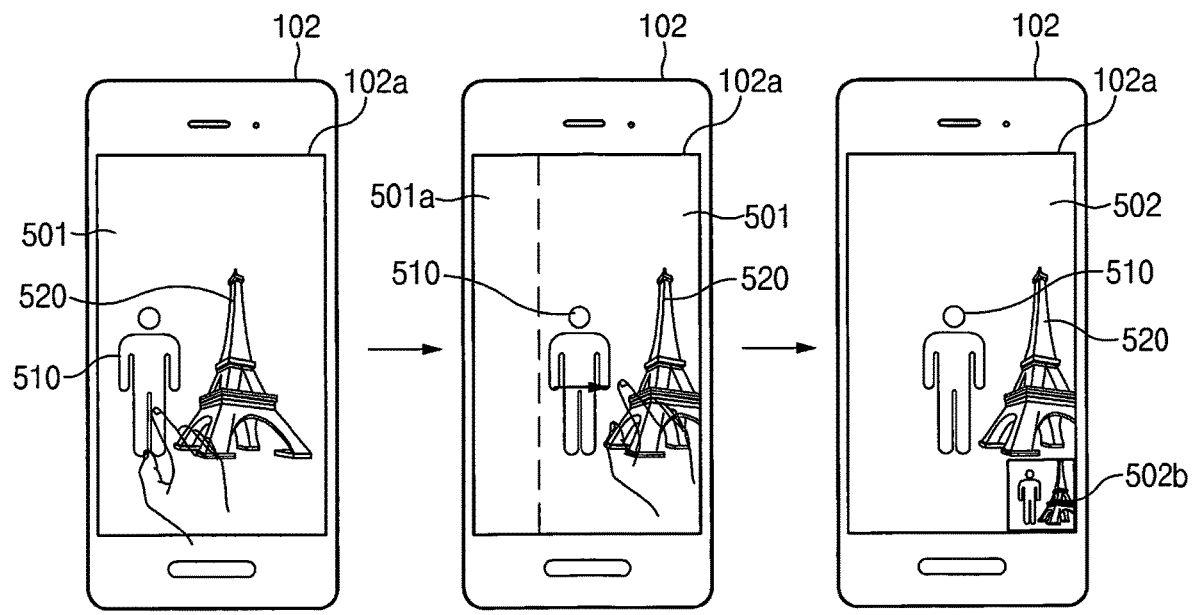
FIGS. 5A to 5D illustrate movement of an unmanned image capturing device by using an image, according to an embodiment of the present disclosure.

Referring to FIG. 5A, a user may move the unmanned image capturing device 101 by moving an image 501 movement displayed in the display 102a. For example, the user may move the image 501 right by touching the display 102a and swiping right. A first object 510 and a second object 520 on a screen may move from the first location to the right side on the display 102a.

Referring to FIG. 5B, as the user moves the image 501, some of an additional image 501a may be output in the display 102a. For example, when a part in which the image 501 is not output in the display 102a is present (e.g., when only a part of an image captured by the unmanned image capturing device 101 is output in the display 102a), the corresponding part may be outputted in the additional image 501a. As another example, a background image (e.g., a white or grey image, an image of color that is similar to the boundary color of the image 501, etc.) may be output in the additional image 501a.

Referring to FIG. 5C, if the user ends a touch input, an image that is output in a screen when the touch input is ended may be output as a reduced image 502b on the display 102a. An image 502 that is being captured during movement of the unmanned image capturing device 101 may be output in the remaining area of the display 102a, i.e., not the area in which the reduced image 502b is output. The user may compare a currently captured image 502 with the image 502b, which the user sets, and may verify a process, in which the unmanned image capturing device 101 moves to a position that the user wants, based on the compared result.

When the user selects the reduced image 502b again, the unmanned image capturing device 101 may stop moving and may standby in order to move to a location that the user selects next.

When the user moves the currently captured image 502 to a new location by touching the currently captured image 502, the controller device 102 may delete the reduced image 502b.

When the user moves an image output in the display 102a, the unmanned image capturing device 101 moves from a first location to a second location based on a movement distance of the image. For example, the unmanned image capturing device 101 may move to a location, at which the changed image 502b is captured, by moving by a distance that is in proportion to a movement distance of the image.

Figure 5D:
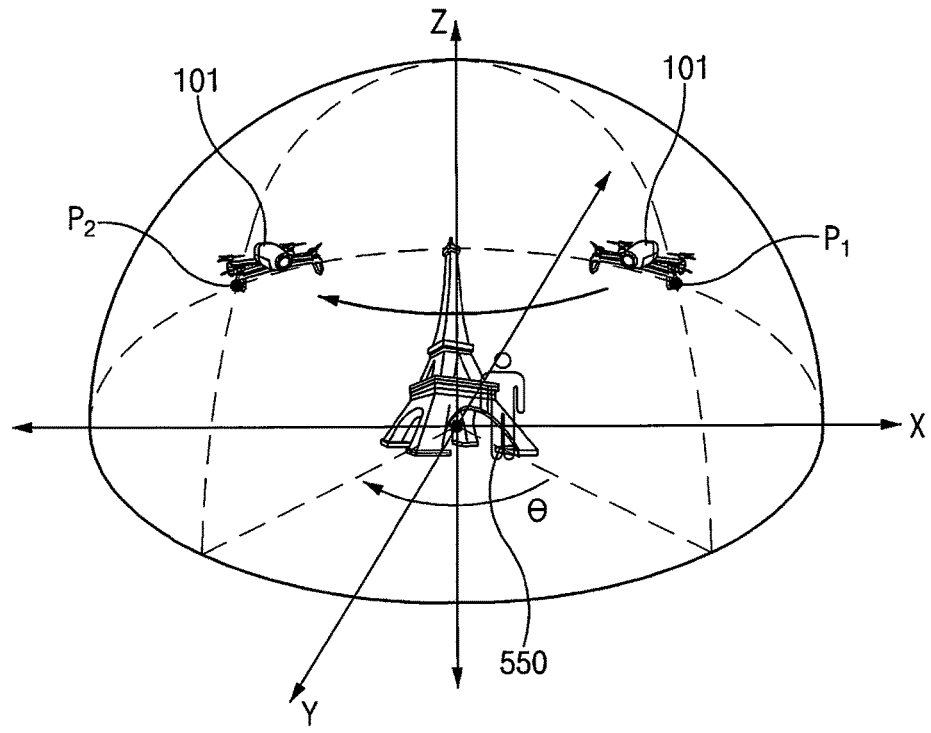

Referring to FIG. 5D, the unmanned image capturing device 101 may move from a location P1 to a location P2 based on a movement distance of an image. The unmanned image capturing device 101 may move with respect to the controller device 102 or with respect to an object (e.g., the user 550) recognized by using image processing. A movement distance of an image may be calculated by applying the movement distance to θ value of a spherical coordinate system. As the movement distance of the image increases, θ value of the spherical coordinate system increases. As the movement distance of the image decreases, θ value of the spherical coordinate system decreases.

A direction in which the user moves the image 501 and a direction in which the unmanned image capturing device 101 moves may vary according to settings.

FIGS. 6A to 6C illustrate a change of composition through a pinch-in/pinch-out input of a user, according to an embodiment of the present disclosure. For example, the operation illustrated in FIGS. 6A to 6C is described with reference to the unmanned image capturing device 101 and the controller device 102 illustrated in FIG. 1.

Referring to FIG. 6A, the user may move the unmanned image capturing device 101 or may control zoom-in/zoom-out of a camera, by enlarging or reducing an image 601 output in the display 102a of the controller device 102.

Referring to FIG. 6B, while the image 601 is being output through the display 102a of the electronic device 102 (e.g., as illustrated in FIG. 6A), the user display an enlarged image 601a in the display 102a of the controller device 102 by enlarging the image 601 through a pinch-out operation. If the user ends a touch input, the unmanned image capturing device 101 may move such that a location of the unmanned image capturing device 101 is closer than a current location from an object 610 based on a user input (e.g., a pinch-out operation). Alternatively, the unmanned image capturing device 101 may provide an effect, which is the same as moving the unmanned image capturing device 101 closer to the object 610, through a zoom-in or enlargement function of the camera 130 of the unmanned image capturing device 101, based on the user input (e.g., a pinch-out operation), without a separate movement.

Referring to FIG. 6C, while the image 601 is being output through the display 102a of the controller device 102 (e.g., as illustrated in FIG. 6A), the user may display a reduced image 601b in the display 102a of the controller device 102 by reducing the image 601 through a pinch-in operation. If the user ends a touch input, the unmanned image capturing device 101 may move such that the location of the unmanned image capturing device 101 is farther than a current location from the object 610 based on the user input (e.g., a pinch-in operation). Alternatively, the unmanned image capturing device 101 may provide an effect, which is the same as moving the unmanned image capturing device 101 farther from the object 610, through a zoom-out or reduction function of the camera 130 of the unmanned image capturing device 101, based on the user input (e.g., a pinch-in operation), without a separate movement.

The user may control at least a part of a function of the unmanned image capturing device 101 by using a pinch-in/pinch-out operation and a swipe operation. For example, the user may determine a desired image by moving, enlarging, and/or reducing the image through a drag input for moving the image output in a display or a pinch-in/pinch-out input. The unmanned image capturing device 101 may move in real time based on the user input. When the user operates an execution button (e.g., a touch button or a physical button), which is separately displayed, after the user completes an operation of an image, the unmanned image capturing device 101 may move to a corresponding location or may execute a zoom-in/zoom-out function of the camera 130 by controlling the movement device 120 based on information in which an image is moved, enlarged, or reduced. Accordingly, a user is not required to manipulate an altitude, a movement direction, etc., of the unmanned image capturing device 101, but may capture a desired image, merely through an intuitive operation using an image.

Figure 7:
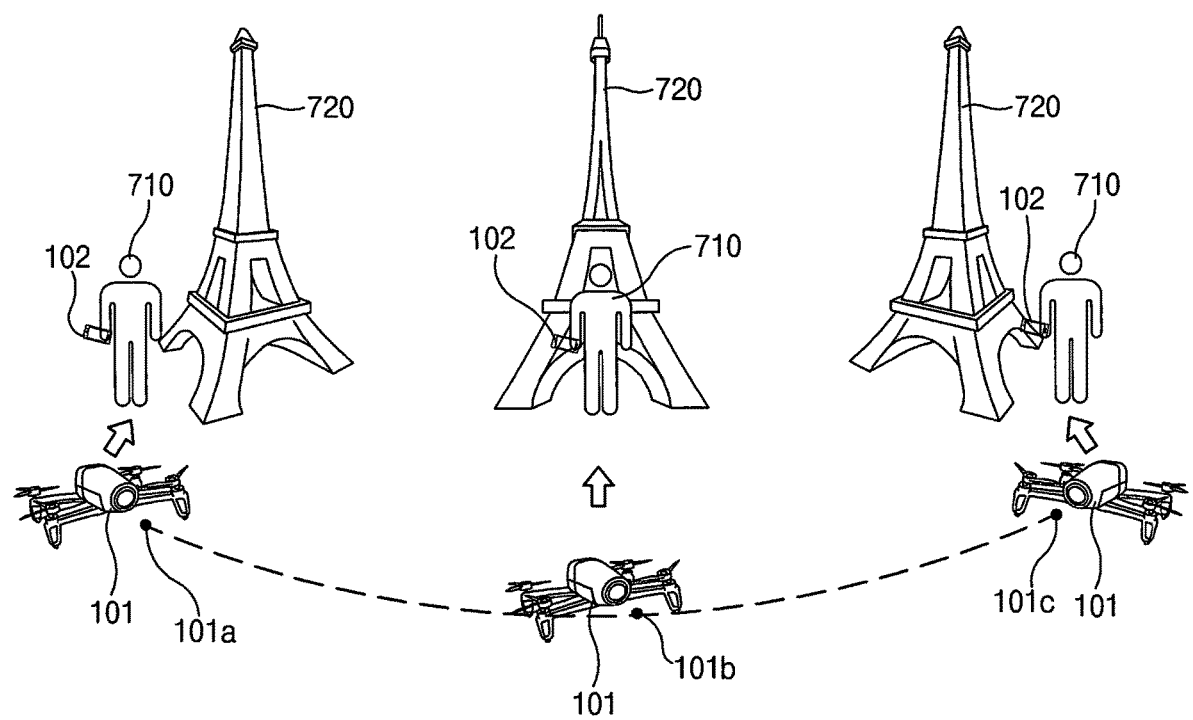
FIG. 7 illustrates movement of an unmanned image capturing device through selection from a plurality of images, according to an embodiment of the present disclosure.

FIG. 7 illustrates movement of an unmanned image capturing device through selection from a plurality of images, according to an embodiment of the present disclosure. For example, the operation illustrated in FIG. 7 is described with reference to the unmanned image capturing device 101 and the controller device 102 illustrated in FIG. 1.

Referring to FIG. 7, while the unmanned image capturing device 101 moves along a specified path (e.g., a path including first to third points 101*a* to 101*c*) with respect to a specified object (e.g., the controller device 102), the unmanned image capturing device 101 may capture a plurality of images. For example, while the unmanned image capturing device 101 moves along a specified path with respect to the electronic device 102 or moves along a specified path with respect to a user 710 that holds the controller device 102, the unmanned image capturing device 101 may capture a plurality of images. As another example, while the unmanned image capturing device 101 moves along a specified path with respect to a nearby object 720 selected by a user, the unmanned image capturing device 101 may capture a plurality of images.

The unmanned image capturing device 101 may store information (e.g., a location of the unmanned image capturing device 101, angle information, zoom-in/zoom-out information, ISO information, a shutter speed, aperture information of a camera, etc.) correspond to each captured image.

At least a part of the plurality of images may be sent to the controller device 102 of the user. For example, the unmanned image capturing device 101 may send an image to the controller device 102 for each specified movement distance (e.g., 1 m). As another example, the unmanned image capturing device 101 may send an image to the controller device 102 for each specified time (e.g., 0.1 seconds to 1 minute).

The user may verify an image sent through the controller device 102. The user may select one, which the user wants, from among the sent images. The controller device 102 may send information (e.g., a file name, an image identification number, etc.) about an image, which is selected by the user, to the unmanned image capturing device 101.

The unmanned image capturing device 101 may verify shooting information associated with the selected image. The unmanned image capturing device 101 may move to a corresponding location based on the verified information (e.g., a location of the unmanned image capturing device 101, angle information, zoom-in/zoom-out information, ISO information, a shutter speed, aperture information of a camera, etc.).

Even though the user does not separately set a movement direction, a movement distance, an altitude, etc., of the unmanned image capturing device 101, the user may move the unmanned image capturing device 101 to a desired location by using a method of selecting an image simply.

Figure 8:
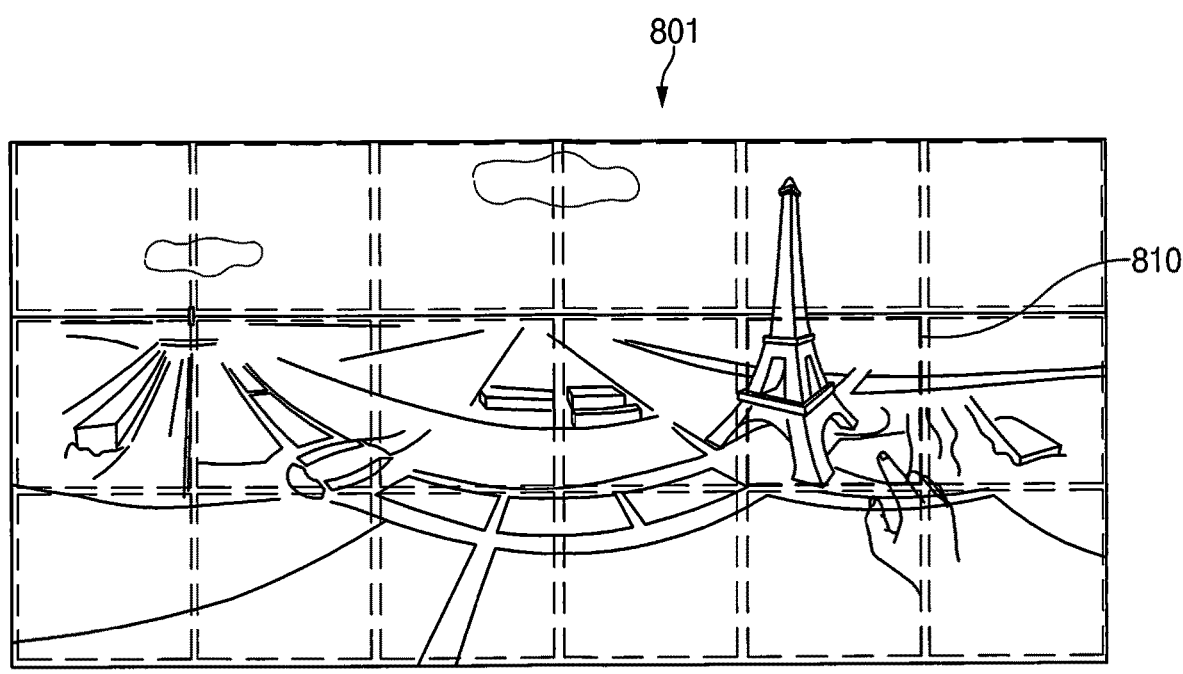
FIG. 8 illustrates movement of an unmanned image capturing device by using a panorama image, according to an embodiment of the present disclosure.

FIG. 8 illustrates movement of an unmanned image capturing device by using a panorama image, according to an embodiment of the present disclosure.

Referring to FIG. 8, an unmanned image capturing device may capture an image of a nearby object by using a camera. For example, the unmanned image capturing device may capture a panorama image 801 by controlling a camera and/or a movement device therein.

For example, a camera in an unmanned image capturing device may be capable of rotating 360 degrees. Accordingly, the unmanned image capturing device may shoot the panorama image 801 by rotating its camera at a specified location.

As another example, the unmanned image capturing device may generate the panorama image 801 based on data of the image captured while the unmanned image capturing device moves by controlling its movement device. An image distortion (e.g., a curve that is generated on an end of the image) does not occur in the panorama image 801 captured by controlling the movement device, and the panorama image 801 may be an image of quality higher than that of a panorama image captured by using a normal camera.

The unmanned image capturing device may distinguish the panorama image 801 in units of a specified block and may store information about a rotation angle of the camera at which each block is captured. The panorama image 801 may be sent to a controller device.

The user may move the unmanned image capturing device to a location, which is suitable for shooting a part of an image, by selecting the part of the image (e.g., a partial image 810) of the panorama image 801. For example, when the user selects the partial image 810 in the panorama image 801, the controller device may send information about the selected block to the unmanned image capturing device.

The unmanned image capturing device may move to a location corresponding to the selected partial image 810 or may rotate the camera. In addition, while the unmanned image capturing device maintains a direction of the camera, the unmanned image capturing device may execute a zoom-in function or may move in a corresponding direction. As such, the unmanned image capturing device may enter a state in which an image in composition the same as composition of the partial image 810 is capable of being captured.

The user may verify the whole of the panorama image 801 output through a display of the controller device and may move the unmanned image capturing device to a desired location based on the verified result.

Figure 9:
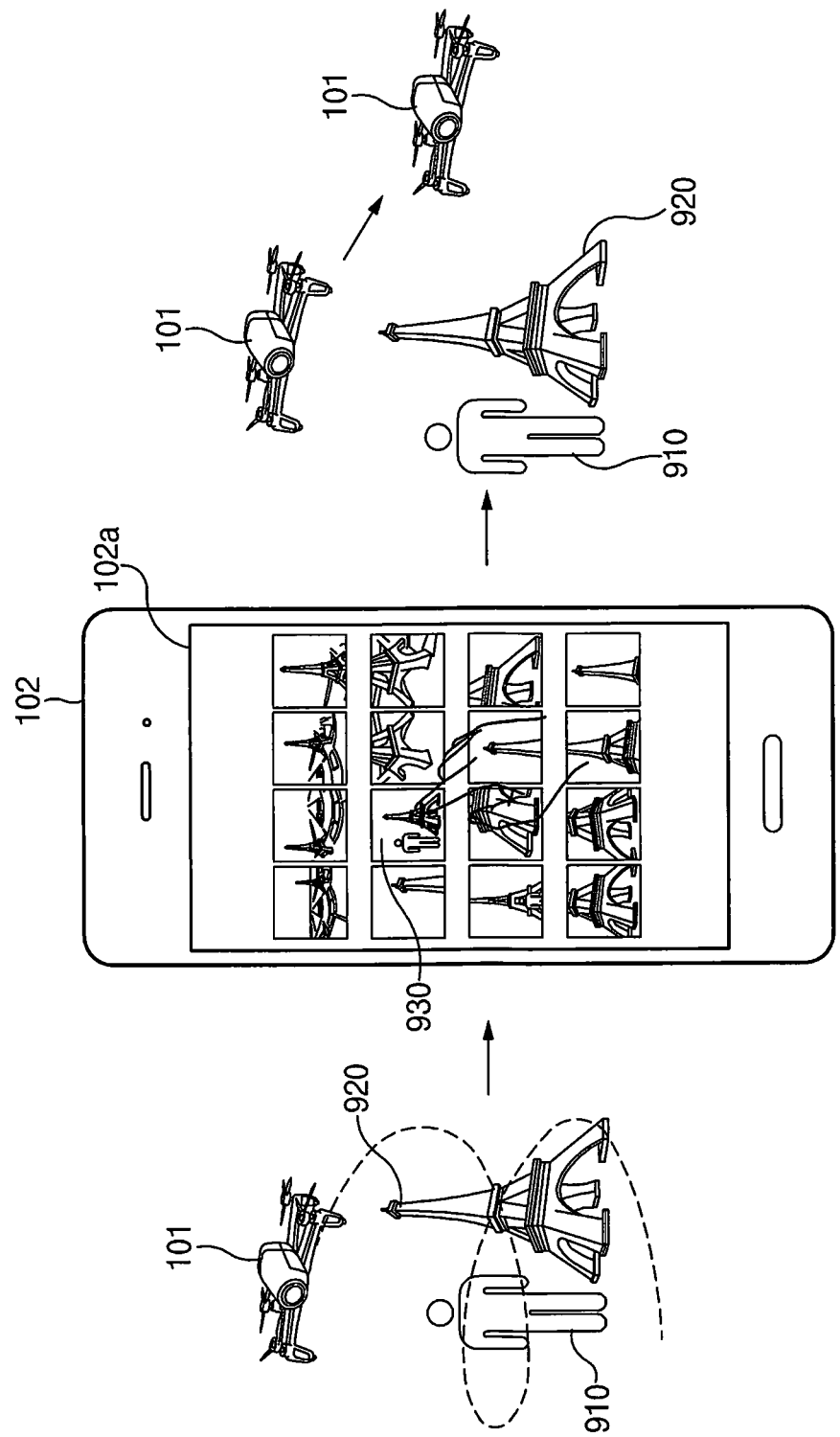
FIGS. 9A to 9C illustrate an operation of collecting a plurality of images while an unmanned image capturing device moves along a specified path, according to an embodiment of the present disclosure.

FIGS. 9A to 9C illustrate an operation of collecting a plurality of images while an unmanned image capturing device moves along a specified path, according to an embodiment of the present disclosure. For example, the operation illustrated in FIGS. 9A to 9C is described with reference to the unmanned image capturing device 101 and the controller device 102 illustrated in FIG. 1.

Referring to FIG. 9A, while the unmanned image capturing device 101 moves along a preset path (e.g., a spiral path about a reference object) with respect to a specified object (e.g., a person 910 or a nearby facility 920 recognized through image processing), the unmanned image capturing device 101 may shoot a plurality of images. Although a spiral path is illustrated in FIG. 9A, the present disclosure is not limited thereto. For example, the unmanned image capturing device 101 may be configured to move along various paths, such as a path in which the unmanned image capturing device 101 rises vertically at a specific height or more, a path in which the unmanned image capturing device 101 rises diagonally with respect to an object, etc.

The path may be differently set according to different modes that are provided to capture an image in the controller device 102. For example, when the controller device 102 provides an image capturing option, such as a portrait mode, a landscape mode, a custom mode, etc., the path may be a vertical rise path in the portrait mode, a diagonal rise path in the landscape mode, or a path, which the user designates, in the custom mode.

The unmanned image capturing device 101 may store information (e.g., a location of the unmanned image capturing device 101, angle information, zoom-in/zoom-out information, ISO information, shutter speed, aperture information of a camera, etc.) corresponding to each captured image.

Referring to FIG. 9B, an image captured while the unmanned image capturing device 101 moves along a specified path may be output in the form of a photo album in the display 102*a* of the controller device 102. The user may send information (e.g., a file name, an image identification number, etc.) about an image for selecting one (e.g., a reduced image 930) of a plurality of images output in the display 102a to the unmanned image capturing device 101.

Referring to FIG. 9C, the unmanned image capturing device 101 may verify shooting information associated with the selected image. The unmanned image capturing device 101 may move to a corresponding location based on the verified shooting information and may change settings of the camera 130.

Figure 10:
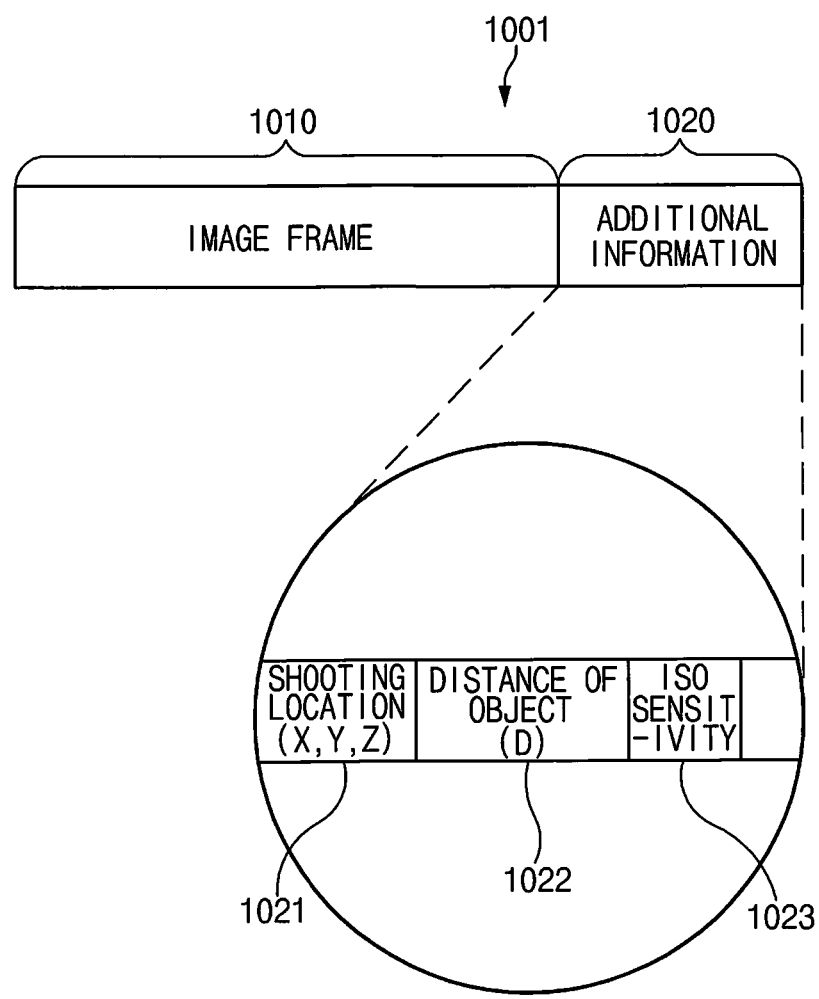
FIG. 10 illustrates image data stored in an unmanned image capturing device, according to an embodiment of the present disclosure.

FIG. 10 illustrates image data stored in an unmanned image capturing device, according to an embodiment of the present disclosure.

Referring to FIG. 10, the unmanned image capturing device generates storage data 1001 based on capturing an image. The unmanned image capturing device may store data on the captured image together with location information and/or setting information. The storage data 1001 includes an image frame 1010 and additional information 1020. The image frame 1010 may include the captured image data. The additional information 1020 may include location information 1021 or setting information (e.g., a distance 1022 between an object and the unmanned image capturing device 101, ISO sensitivity 1023, etc.) of the unmanned image capturing device 101 at a point in time when a corresponding image is captured. Although not illustrated in FIG. 10, the setting information may include information about various settings associated with image capturing, such as a shutter speed, aperture information, filter information, etc.

While the unmanned image capturing device changes at least one setting item (e.g., ISO sensitivity) of the shooting setting information at the same location, the unmanned image capturing device may capture a plurality of images. When a user selects an image in the controller device, the unmanned image capturing device may additionally capture an image while the unmanned image capturing device maintains a value of the setting item stored together with the selected image.

The unmanned image capturing device may send data included in the image frame 1010 or a preview image, which is obtained by converting the image frame 1010, to the controller device. The user may verify an image captured through the controller device and may change an image by moving, enlarging, and/or reducing the image, if necessary. The controller device may send information about the changed image to the unmanned image capturing device, which may move based on change information of an image and the location information 1021 in the additional information 1020. For example, the unmanned image capturing device may move by a distance corresponding to change information of the image from a location based on the location information 1021.

Alternatively, the user may verify a plurality of images captured through the controller device (or another external electronic device through the controller device) and may select one of a plurality of images based on the verified result. The controller device may send capturing information about the selected image to the unmanned image capturing device 101 and may move the unmanned image capturing device based on the sent capturing information. For example, the controller device may send the location information 1021 in the additional information 1020, which is stored together with the selected image, to the unmanned image capturing device, which moves to a location for capturing based on the received location information 1021.

Figure 11:
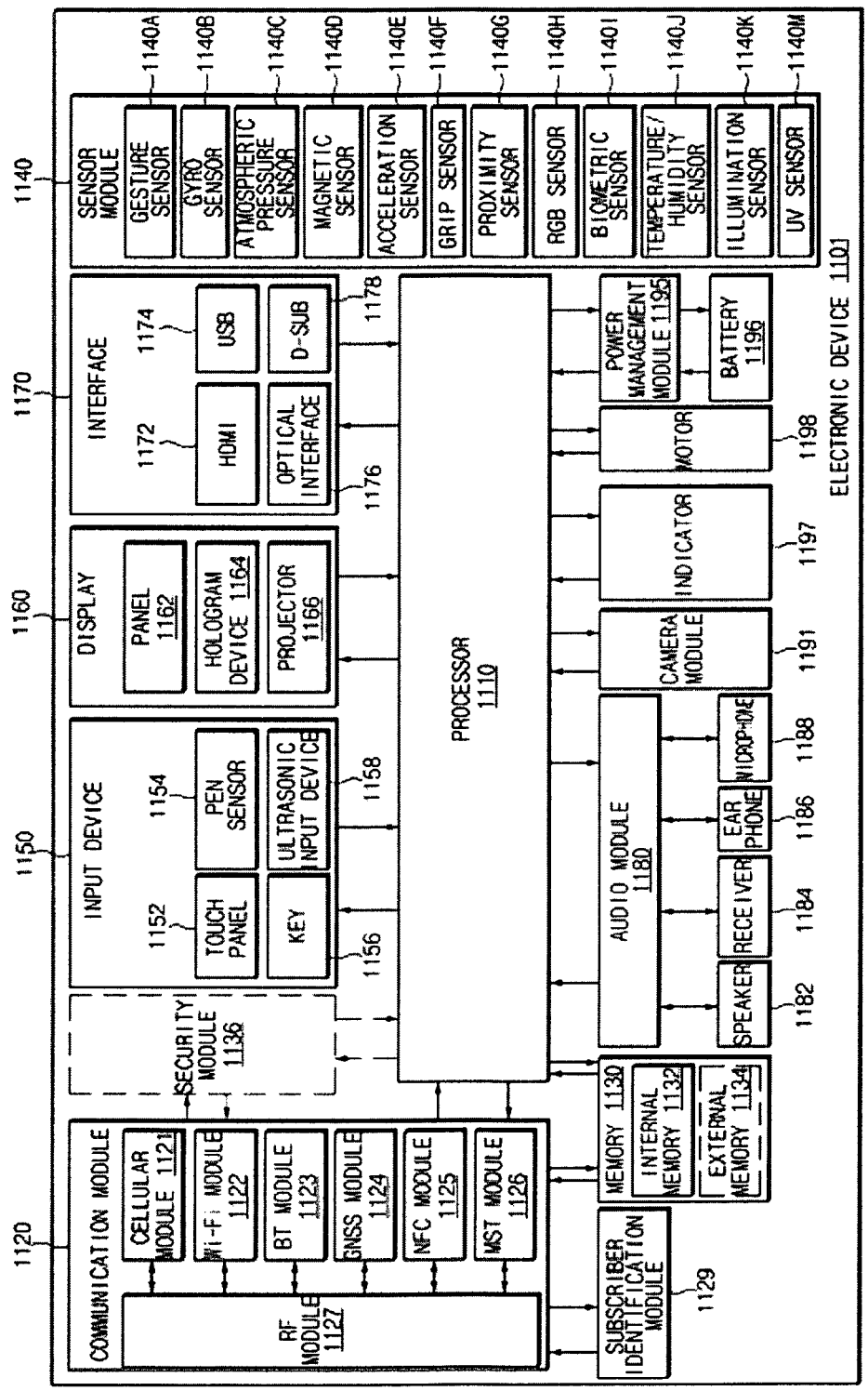
FIG. 11 illustrates an electronic device according to an embodiment of the present disclosure.

FIG. 11 illustrates an electronic device according to an embodiment of the present disclosure.

Referring to FIG. 11, the electronic device 1101 includes a processor (e.g., an AP) 1110, a communication module 1120, a subscriber identification module 1129, a memory 1130, a sensor module 1140, an input device 1150, a display 1160, an interface 1170, an audio module 1180, a camera module 1191, a power management module 1195, a battery 1196, an indicator 1197, and a motor 1198.

The processor 1110 may drive an operating system (OS) or an application to control a plurality of hardware or software elements connected to the processor 1110 and may process and compute a variety of data. The processor 1110 may be implemented with a System on Chip (SoC), for example. The processor 1110 may further include a graphic processing unit (GPU) and/or an image signal processor. The processor 1110 may include at least a part (e.g., a cellular module 1121) of elements illustrated in FIG. 11. The processor 1110 may load and process an instruction or data, which is received from at least one of other elements (e.g., a nonvolatile memory) and may store a variety of data in a nonvolatile memory.

The communication module 1120 includes the cellular module 1121, a Wi-Fi module 1122, a Bluetooth (BT) module 1123, a GNSS module 1124 (e.g., a GPS module, a Glonass module, a Beidou module, or a Galileo module), an NFC module 1125, a magnetic stripe transmission (MST) module 1126, and a radio frequency (RF) module 1127.

The cellular module 1121 may provide voice communication, video communication, a message service, an Internet service, etc., through a communication network. The cellular module 1121 may perform discrimination and authentication of the electronic device 1101 within a communication network using the subscriber identification module 1129 (e.g., a SIM card). The cellular module 1121 may perform at least a portion of functions that the processor 1110 provides. The cellular module 1121 may include a CP.

Each of the Wi-Fi module 1122, the BT module 1123, the GNSS module 1124, and the NFC module 1125 may include a processor for processing data exchanged through a corresponding module. At least a part (e.g., two or more elements) of the cellular module 1121, the Wi-Fi module 1122, the BT module 1123, the GNSS module 1124, or the NFC module 1125 may be included within one Integrated Circuit (IC) or an IC package.

The RF module 1127 may transmit and receive a communication signal (e.g., an RF signal). The RF module 1127 may include a transceiver, a power amplifier module (PAM), a frequency filter, a low noise amplifier (LNA), an antenna, etc. At least one of the cellular module 1121, the Wi-Fi module 1122, the BT module 1123, the GNSS module 1124, or the NFC module 1125 may transmit and receive an RF signal through a separate RF module.

The subscriber identification module 1129 may include a card and/or embedded SIM that includes a SIM and may include unique identify information (e.g., integrated circuit card identifier (ICCID)) or subscriber information (e.g., international mobile subscriber identity (IMSI)).

The memory 1130 includes an internal memory 1132 and an external memory 1134. The internal memory 1132 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, or a NOR flash memory), a hard drive, or a solid state drive (SSD).

The external memory 1134 may include a flash drive, such as a compact flash (CF), a secure digital (SD), a micro secure digital (Micro-SD), a mini secure digital (Mini-SD), an extreme digital (xD), a multimedia card (MMC), a memory stick, etc. The external memory 1134 may be functionally and/or physically connected with the electronic device 1101 through various interfaces.

The sensor module 1140 may measure a physical quantity or may detect an operation state of the electronic device 1101. The sensor module 1140 may convert the measured or detected information to an electric signal.

The sensor module 1140 includes a gesture sensor 1140A, a gyro sensor 1140B, an atmospheric pressure sensor 1140C, a magnetic sensor 1140D, an acceleration sensor 1140E, a grip sensor 1140F, a proximity sensor 1140G, a color sensor 1140H (e.g., a red, green, blue (RGB) sensor), a biometric sensor 1140I, a temperature/humidity sensor 1140J, an illumination sensor 1140K, and an ultraviolet (UV) sensor 1140M. Additionally or alternatively, the sensor module 1140 may include an E-nose sensor, an electromyography sensor (EMG) sensor, an electroencephalogram (EEG) sensor, an electrocardiogram (ECG) sensor, an infrared (IR) sensor, an iris sensor, and/or a fingerprint sensor. The sensor module 1140 may further include a control circuit for controlling at least one or more sensors included therein.

The electronic device 1101 may further include a processor, which is a part of the processor 1110 or independent of the processor 1110 and is configured to control the sensor module 1140. The processor may control the sensor module 1140 while the processor 1110 remains at a sleep state.

The input device 1150 includes a touch panel 1152, a (digital) pen sensor 1154, a key 1156, and an ultrasonic input unit 1158. The touch panel 1152 may use at least one of capacitive, resistive, infrared, and ultrasonic detecting methods. Also, the touch panel 1152 may further include a control circuit. The touch panel 1152 may further include a tactile layer to provide a tactile reaction to a user.

The (digital) pen sensor 1154 may be a portion of a touch panel or may include an additional sheet for recognition.

The key 1156 may include a physical button, an optical key, a keypad, etc.

The ultrasonic input device 1158 may detect (or sense) an ultrasonic signal, which is generated from an input device, through a microphone 1188 and may check data corresponding to the detected ultrasonic signal.

The display 1160 includes a panel 1162, a hologram device 1164, and a projector 1166. The panel 1162 may be implemented to be flexible, transparent or wearable. The panel 1162 and the touch panel 1152 may be integrated into a single module.

The hologram device 1164 may display a stereoscopic image in a space using a light interference phenomenon.

The projector 1166 may project light onto a screen so as to display an image. The screen may be arranged inside or outside the electronic device 1101.

The display 1160 may further include a control circuit for controlling the panel 1162, the hologram device 1164, and/or the projector 1166.

The interface 1170 includes a high-definition multimedia interface (HDMI) 1172, a universal serial bus (USB) 1174, an optical interface 1176, and a D-subminiature (D-sub) 1178. Additionally or alternatively, the interface 1170 may include a mobile high definition link (MHL) interface, a SD card/multi-media card (MMC) interface, and/or an infrared data association (IrDA) standard interface.

The audio module 1180 may convert a sound and an electrical signal in dual directions. The audio module 1180 may process sound information that is input or output through a speaker 1182, a receiver 1184, an earphone 1186, and/or the microphone 1188.

The camera module 1191 for capturing a still image or a video may include at least one image sensor (e.g., a front sensor or a rear sensor), a lens, an image signal processor (ISP), or a flash (e.g., an LED or a xenon lamp).

The power management module 1195 may manage power of the electronic device 1101. A power management integrated circuit (PMIC), a charger IC, or a battery gauge may be included in the power management module 1195. The PMIC may have a wired charging method and/or a wireless charging method. The wireless charging method may include a magnetic resonance method, a magnetic induction method or an electromagnetic method and may further include an additional circuit, for example, a coil loop, a resonant circuit, a rectifier, etc.

The battery gauge may measure a remaining capacity of the battery 1196 and a voltage, current, and/or temperature of the battery 1196 while being charged. The battery 1196 may include a rechargeable battery or a solar battery.

The indicator 1197 may display a specific state of the electronic device 1101 or a part thereof (e.g., the processor 1110), such as a booting state, a message state, a charging state, etc.

The motor 1198 may convert an electrical signal into a mechanical vibration and may generate a vibration effect, a haptic effect, etc.

Although not illustrated, a processing device (e.g., a GPU) for supporting a mobile TV may be included in the electronic device 1101. The processing device for supporting a mobile TV may process media data according to the standards of digital multimedia broadcasting (DMB), digital video broadcasting (DVB), MediaFlo™, etc.

As described above, an electronic device according to an embodiment of the present disclosure may include a display that is capable of outputting an image, a communication circuit that is capable of sending and receiving data to and from an unmanned image capturing device, a memory that is capable of storing image data sent from the unmanned image capturing device and a processor electrically connected with the display, the communication circuit, and the memory, wherein the memory stores instructions, the instructions, when executed by the processor, causing the processor to receive an image captured through the unmanned image capturing device, output the captured image to the display, receive a user input for converting the output image and send information based on the converted image to the unmanned image capturing device.

The instructions cause the processor to receive an image captured based on information sent from the unmanned image capturing device.

Each of the above-mentioned elements may be configured with one or more components, and the names of the elements may be changed according to the type of the electronic device. The electronic device according to various embodiments may include at least one of the above-mentioned elements, and some elements may be omitted or other additional elements may be added. Further, some of the elements of the electronic device according to various embodiments may be combined with each other so as to form one entity, so that the functions of the elements may be performed in the same manner as before the combination.

Herein, the term "module" may represent a unit including one or more combinations of hardware, software and firmware. For example, the term "module" may be interchangeably used with the terms "unit", "logic", "logical block", "component" and "circuit". A "module" may be a minimum unit of an integrated component or may be a part thereof. A "module" may be a minimum unit for performing one or more functions or a part thereof. A "module" may be implemented mechanically or electronically. For example, a "module" may include at least one of an application-specific IC (ASIC) chip, a field-programmable gate array (FPGA), and a programmable-logic device for performing some operations, which are known or will be developed.

At least a portion of an apparatus (e.g., modules or functions thereof) or a method (e.g., operations) according to various embodiments may be implemented by instructions stored in a computer-readable storage media in the form of a program module. The instruction, when executed by a processor, may cause the one or more processors to perform a function corresponding to the instruction.

The computer-readable storage media according to various embodiments may store a program for executing an operation in which a communication module receives an application package from an external device and provides the application package to a normal module of a processor, an operation in which the normal module determines whether a secure application is included in at least a portion of the application package, and an operation in which the secure module of the processor installs the secure application in the secure module or in a memory associated with the secure module.

The computer-readable storage media may include a hard disk, a floppy disk, a magnetic media (e.g., a magnetic tape), an optical media (e.g., a compact disc read only memory (CD-ROM) and a digital versatile disc (DVD)), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above-mentioned hardware devices may be configured to operate as one or more software modules to perform operations according to various embodiments, and vice versa.

Modules or program modules according to various embodiments may include at least one or more of the above-mentioned elements, some of the above-mentioned elements may be omitted, or other additional elements may be further included therein. Operations executed by modules, program modules, or other elements according to various embodiments may be executed by a successive method, a parallel method, a repeated method, or a heuristic method. Also, a part of operations may be executed in different sequences, omitted, or other operations may be added.

According to the above-described embodiments of the present disclosure, an image capturing method using an unmanned image capturing device (e.g., a drone device) may easily and intuitively capture a desired image without a user having to learn a difficult method of operating the unmanned image capturing device.

Further, an image shooting method is provided using an unmanned image capturing device that automatically moves the unmanned image capturing device based on user input information received in at least one or more of a plurality of images captured by using the unmanned image capturing device, and shoots an image.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An unmanned image capturing device comprising:
 a movement device that moves the unmanned image capturing device;
 a camera;
 a communication circuit;
 a location detection circuit that detects a location of the unmanned image capturing device;
 a processor; and
 a memory that stores instructions, which when executed by the processor, instruct the processor to:
 move the unmanned image capturing device using the movement device,
 capture a plurality of images using the camera,
 detect, using the location detection circuit, a plurality of three-dimensional locations of the unmanned image capturing device, wherein the plurality of images are respectively captured at the plurality of three-dimensional locations by the unmanned image capturing device,
 send, to an external device using the communication circuit, at least one of the captured images and information about the respective detected location of the at least one of the captured images,
 receive, from the external device through the communication circuit, a command based on a selection of a captured image to change location of the unmanned image capturing device to the detected location of the selected captured image of the plurality of captured images, and
 control the movement device to move the unmanned image capturing device to the location of the selected captured image based on the received command;
 wherein the instructions further instruct the processor to zoom the camera in or out, or to move the unmanned image capturing device closer to or far away from a specified object, based on the received command.

2. The unmanned image capturing device of claim 1, wherein the instructions further instruct the processor to capture the plurality of images while the unmanned image capturing device moves along a preset path.

3. The unmanned image capturing device of claim 1, wherein the instructions further instruct the processor to generate at least one panorama image from the plurality of images.

4. The unmanned image capturing device of claim 1, wherein the instructions further instruct the processor to:
 generate at least one preview image from the plurality of images; and
 send the at least one preview image using the communication circuit.

5. The unmanned image capturing device of claim 1, wherein the selection comprises at least one of moving, enlarging, and reducing of the at least one of the captured images.

6. The unmanned image capturing device of claim 1, wherein the instructions further instruct the processor to calculate movement of the unmanned image capturing device using a spherical coordinate system or a cylindrical coordinate system with respect to an object that is recognized by using the camera or the communication circuit, based on the received command.

7. The unmanned image capturing device of claim 6, wherein the instructions further instruct the processor to:
   maintain a same straight line distance from the object; and
   move the unmanned image capturing device at least one of up, down, left, and right, in response to the received command.

8. The unmanned image capturing device of claim 6, wherein the instructions further instruct the processor to:
   maintain a same horizontal distance from the object; and
   move the unmanned image capturing device at least one of up, down, left, and right, in response to the received command.

9. A method of operating an unmanned image capturing device, the method comprising:
   moving the unmanned image capturing device;
   capturing at least one image;
   detecting a plurality of three-dimensional locations of the unmanned image capturing device, wherein the plurality of images are respectively captured at the plurality of three-dimensional locations by the unmanned image capturing device;
   sending the at least one image to a controller device that operates the unmanned image capturing device;
   receiving a command based on a selection of a captured image to change location of the unmanned image capturing device to the detected location of the selected captured image of the at least one image; and
   moving the unmanned image capturing device to the location of the selected captured image based on the received command; wherein moving the unmanned image capturing device comprises zooming a camera in or out or moving the unmanned image capturing device closer to or farther away from a specified object, based on the received command.

10. The method of claim 9, wherein capturing the at least one image comprises capturing the at least one image at a preset location.

11. The method of claim 9, wherein capturing the at least one image comprises capturing a plurality of images while the unmanned image capturing device moves along a preset path.

12. The method of claim 9, further comprising storing at least one of location information and setting information of the unmanned image capturing device, corresponding to the captured at least one image.

13. The method of claim 9, wherein sending the at least one image comprises:
   generating a preview image of the at least one image; and
   sending data associated with the preview image to the controller device.

14. The method of claim 9, wherein receiving the selection comprises receiving at least one of movement information and expansion information of the at least one image.

15. The method of claim 14, wherein moving the unmanned image capturing device comprises:
   maintaining a same straight line distance from a specified object; and
   moving the unmanned image capturing device at least one of up, down, left, and right, based on the movement selection.

16. The method of claim 14, wherein moving the unmanned image capturing device comprises:
   maintaining a same horizontal distance from a specified object; and
   moving the unmanned image capturing device at least one of up, down, left, and right, based on the movement selection.

* * * * *